No. 790,421. PATENTED MAY 23, 1905.
E. H. BELDEN.
VARIABLE SPEED GEARING.
APPLICATION FILED AUG. 1, 1904.

Witnesses:-
Louis M. F. Whitehead
John P. Lefevre

Inventor:-
Edward H. Belden
by C. V. Hawley
Atty:-

No. 790,421. PATENTED MAY 23, 1905.
E. H. BELDEN.
VARIABLE SPEED GEARING.
APPLICATION FILED AUG. 1, 1904.

Witnesses:-
Louis M. F. Whitehead
John R. Lefevre

Inventor.
Edward H. Belden
by C. V. Hawley
Atty.

No. 790,421. Patented May 23, 1905.

UNITED STATES PATENT OFFICE.

EDWARD H. BELDEN, OF CHICAGO, ILLINOIS.

VARIABLE-SPEED GEARING.

SPECIFICATION forming part of Letters Patent No. 790,421, dated May 23, 1905.

Application filed August 1, 1904. Serial No. 219,034.

*To all whom it may concern:*

Be it known that I, EDWARD H. BELDEN, a resident of Chicago, county of Cook, and State of Illinois, have invented certain new and useful Improvements in Variable-Speed Gearings, of which the following is a specification.

My invention relates to improvements in variable-speed gears, and has special reference to a novel gearing particularly adapted for governing the direction and speed of automobiles.

The invention relates particularly to means for variably connecting or joining the motor of an automobile to the driving-wheels of the vehicle.

A primary object of this invention is to equip an automobile or motor-vehicle with a speed-controlling, stopping, and reversing mechanism of simple and durable construction and which shall practically be governed by a single lever, whereby the chauffeur may control the action of his machine with ease and certainty and without having his attention distracted from the steering mechanism or the emergency-brake.

Another object of the invention is to so equip a motor-vehicle that it may be operated and controlled almost entirely by foot pedals or levers with a view to simplifying the manipulation of the steering mechanism.

The particular object of the invention is to provide a variable-speed gearing that shall be composed of only two members, together with means for relatively adjusting said members, and which gears may be instantly and easily operated without possibility of injury through hasty or careless manipulation.

Another object is to provide a variable-speed mechanism that shall serve as a positive clutch or connection between the motor and the driven shaft, axle, or wheels and one member of which shall be so arranged that when it is moved the motor and the driven shaft will be disconnected.

A still further object of the invention is to provide a variable-speed gear having a member to be shifted, but which shall be movable only when power is removed from the opposed member and which cannot be engaged with the driving member unless it is in exactly the right relation thereto.

A further object is to provide a gearing that may be arranged at practically any point between the motor and the driven shaft.

Further particular objects of the invention are to provide a gearing of the class described that shall be composed of only two spurred-gear members; that shall have its gear members at right angles to one another and so arranged that one thereof may be moved across the face of the other to vary its speed, to stop the same, or to reverse its rotation; to provide a variable-speed spurred gearing in which the members shall in all positions of engagement be in rolling contact; to provide a variable-speed gearing wherein the teeth or spurs of the members shall be uniform throughout, and hence simple to manufacture and of low cost, and to provide means, in connection with the members of the gearing, for easily operating the same, and particularly for locking them in their several positions of engagement and disengagement.

Other objects of the invention and the manner of attaining the same will appear hereinafter.

My invention consists generally in a variable-speed gearing of the construction and combination of parts hereinafter described, and particularly pointed out in the claims.

My invention will be more readily understood by reference to the accompanying drawings, forming a part of this specification, and in which—

My invention is capable of general use in the arts; but it is especially intended and desired for motor cars and vehicles. Concerning the latter uses it may here be remarked that my variable-speed gear may be employed as a direct connection between any driving and driven shafts, such as the motor-shaft and the driven axle or wheel of a motor-vehicle, or, as herein shown, the gearing may connect intermediate parts, such as the motor-shaft and the usual transmission or counter shaft of the vehicle.

My invention includes a motor-driven shaft and a power-transmitting shaft arranged substantially at right angles, together with a variable-speed gear having members upon both said shafts and means movable with relation to said shafts for operating the members of said gear.

Various devices typical of motor-vehicles are associated with the gearing; but the central feature of my invention resides in the variable-speed gear, the other elements being grouped about and dependent thereon, and for this reason I shall apply myself directly to the description of said gearing in detail, touching but lightly upon the well-known features and elements of motor-vehicle structures.

The vehicle proper, as herein shown, is of a well-known type, comprising a frame mounted upon the usual axles and wheels and carrying a gasolene or other motor 2. The power-transmitting shaft 3 occupies the usual transverse position upon the vehicle-frame and is connected with the rear wheels 4 4 in the usual manner.

5 is the motor-driven shaft, arranged longitudinally of the frame and occupying suitable bearings thereon. The connection between the motor fly-wheel 2' and the driven shaft 5 is effected by a conical friction-clutch of ordinary design, but so arranged that its member 6' is movable longitudinally with the shaft 5. I preferably employ a foot-lever 7 for operating the shaft and friction-clutch, connecting the same thereto through the medium of rocking shaft 7' and arm 7''. When the upper end of the foot-lever is pushed forward, the members of the friction-clutch will be disengaged. The rear end of the shaft 5 carries a large disk 8, having two or more circular rows of spurs, teeth, or pins upon its face and adapted to move with the shaft. The distance between the disk 8 and the transmission-shaft 3 may therefore be increased by pushing forward the foot-lever 7. The transmission-shaft 3 carries a spur-pinion 10, which is, in an operative sense, attached to the shaft by a spline or feather to be moved longitudinally thereon—in other words, across the face of the disk 8—to engage the spur-wheel 10 with either of the rows of teeth on the disk. It will be obvious that when the pinion is engaged with the inner row of disk-teeth several revolutions of the motor drive-shaft 5 will be required to impart a single revolution to the transmission-shaft 3, and the transmission speed will be low, likewise the speed of the vehicle. On the other hand, when the pinion is engaged with the outermost row of disk-teeth it will be as though a larger gear had been caused to mesh with the pinion, and its speed will be increased. The middle set of disk-teeth afford an intermediate speed. The pinion 10 may be moved when, and only when, the disk 8 is retired or retracted by means of the foot-lever 7.

Figure 3:
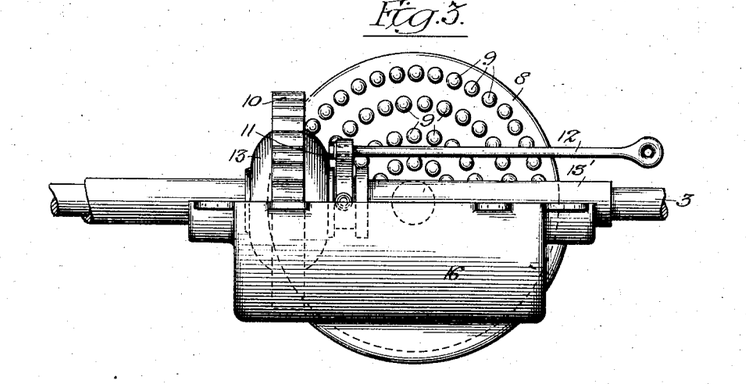
Fig. 3 is an enlarged detail of the variable-speed gear, being a rear elevation thereof, with the upper part of the gear-case removed.
Figure 4:
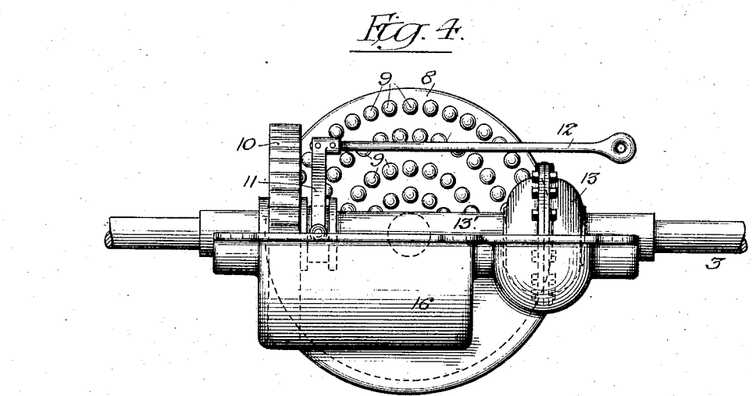
Fig. 4 illustrates a modification.
Figure 5:
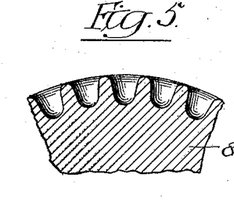
Figs. 5, 6, and 7 and 8 illustrate several of the less desirable forms of the spur-pinion.
Figure 6:
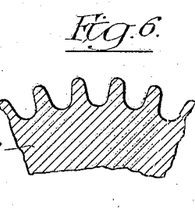
Figure 7:
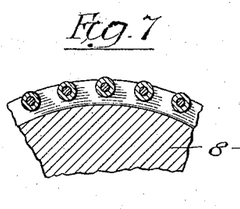
Figure 8:
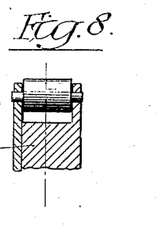

11 represents a collar on the hub of the pinion 10, and to this I connect a rod 12, sliding in the gear-case and adapted to be operated by a lever 12', which preferably extends from the steering-post 14. 15 is the operating-handle thereof, located beneath the steering-wheel. These parts are shown in detail in Figs. 3 and 4. Figs. 3 and 4 also show the compensating or differential gear and illustrate two methods for arranging such a gear for operation from a movable spur-pinion 10. If desired, the compensating gear may be slidable with the pinion, or the pinion may be slidable upon a long sleeve or hub 13' belonging to said compensating gear 13. Each construction provides for imparting different speeds to the two ends or parts of the transmission-shaft 3, and hence the rear wheels, as required. The compensating or differential gear being of well-known construction is elaborated upon only in Figs. 11 and 12 of the drawings.

Before passing to a more detailed description of my invention I wish to state that the teeth of the multiple-gear disk may partake of different forms, as may the teeth of the pinion 10; but careful observation and experiment show that the best results are only obtainable when the pinion 10 is a simple spur-wheel having teeth formed upon true or regular curves and when the teeth of the disk possess longitudinal curves that exactly operatively correspond to those of the pinion-teeth. It may also be remarked that my invention is intended to embrace or include any mechanism whereby the friction-clutch and the gear-disk may be successively disengaged and engaged, to the end that the driven shaft 5 shall be released from the motor prior to either the disengagement or the engagement of the members of the variable-speed gear. Likewise various mechanisms may be used for shifting the pinion at moments when it is disengaged from the disk and for securing the same against longitudinal movement during its periods of engagement therewith.

In carrying my invention into effect I prefer the constructions which are fully disclosed in Figs. 9 to 21 of the drawings. I have here illustrated a complete mechanism capable of performing all of the needed functions and of demonstrated utility and efficiency.

Figure 1:
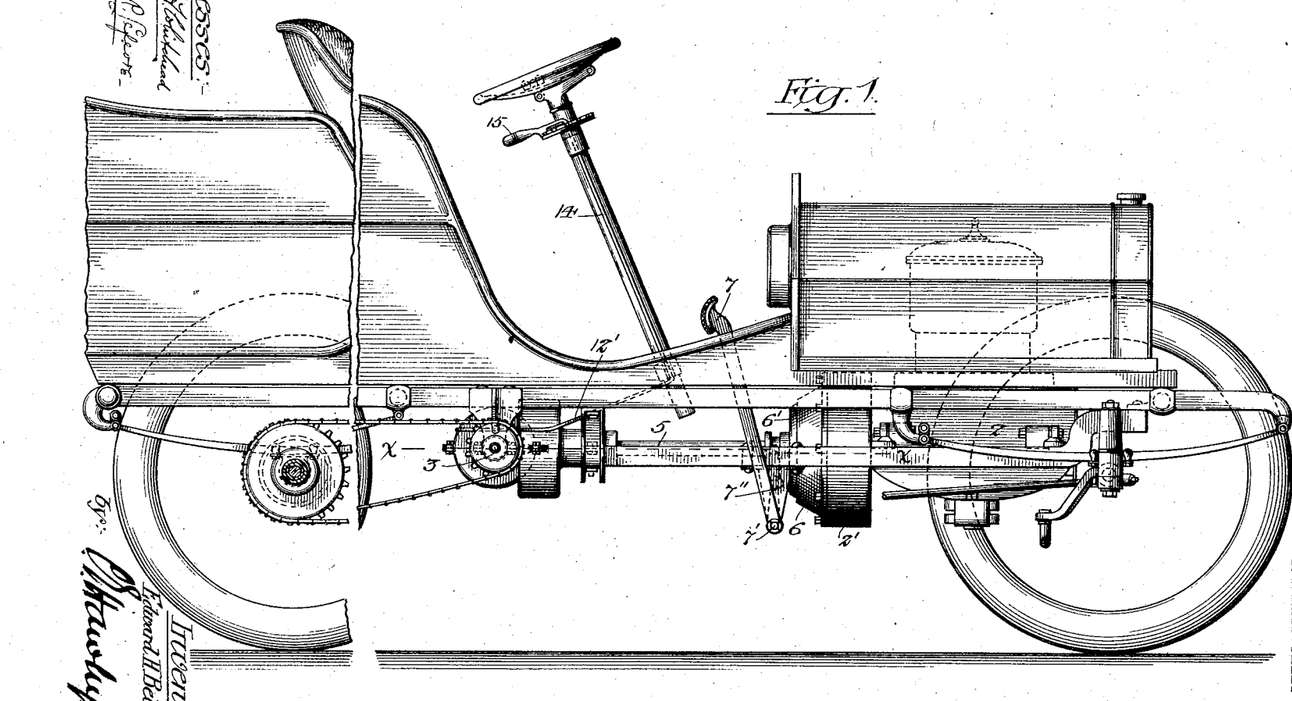
Figure 1 is a side elevation of an automobile equipped with a variable-speed gear embodying my invention.
Figure 2:
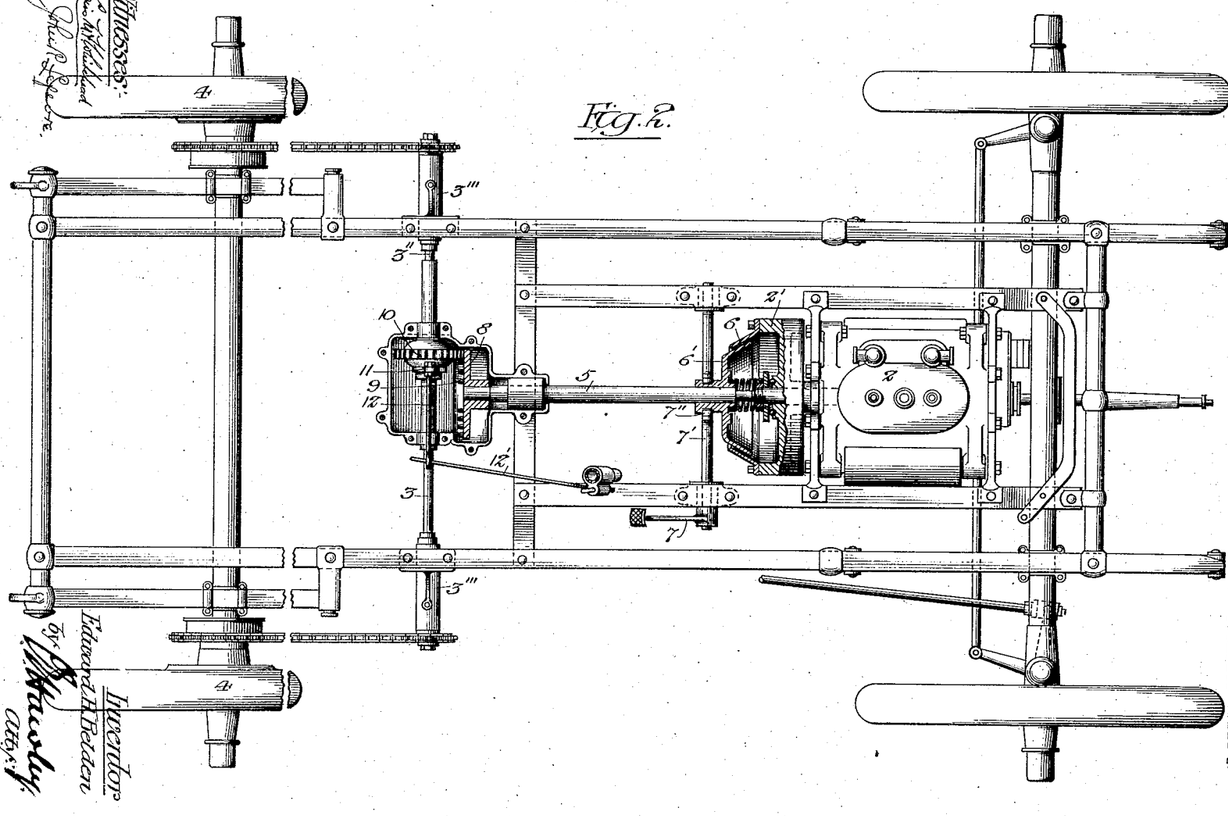
Fig. 2 is a plan view with the body removed, showing the gearing in section on the line *x x* of Fig. 1.
Figure 9:
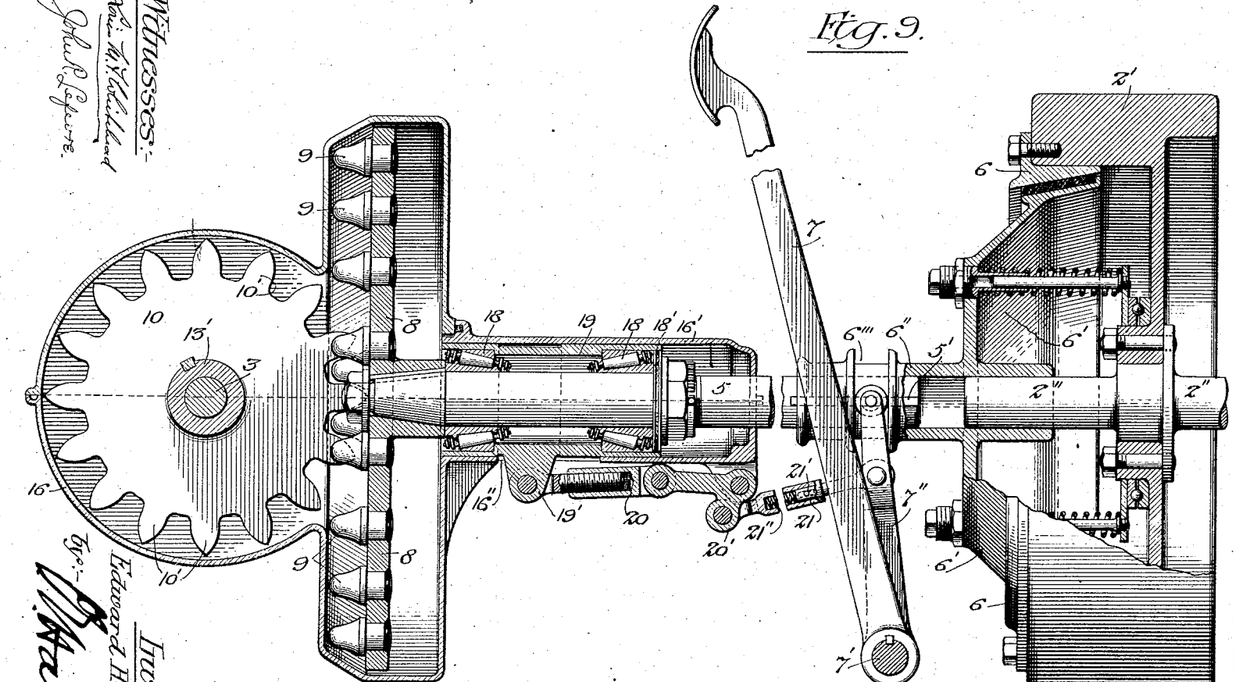
Fig. 9 is an enlarged side elevation of the driving mechanism, including the variable-speed gear.
Figure 10:
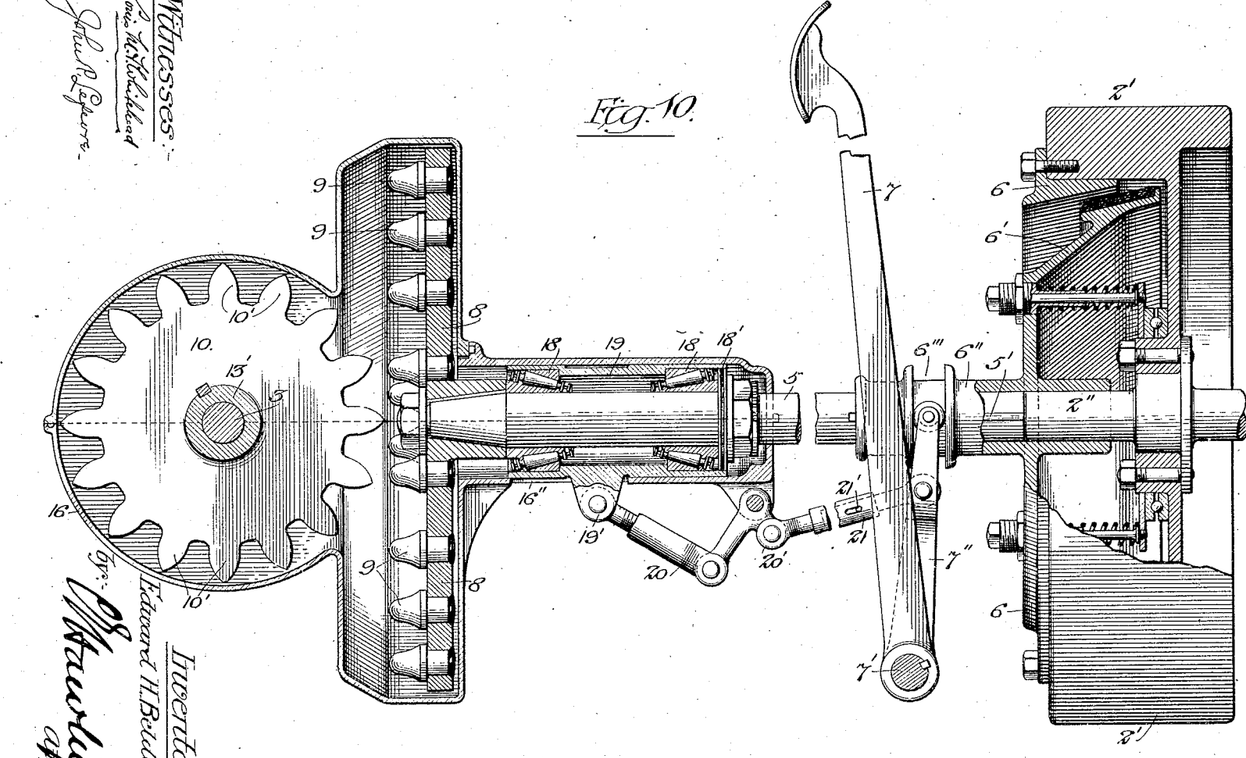
Fig. 10 is a similar view showing the various members disconnected.

The construction shown in Fig. 2, wherein the clutch member and the spur-disk are fastened to the shaft 5 to move together, is fairly acceptable; but I prefer to so construct the parts that the clutch member or cone 6' may be entirely disengaged from the fly-wheel before the spur-disk of the gearing begins to move away from the shiftable pinion. It will be seen that the gear-casing 16 is made to hold the roller-bearings 17 17 and 18 for the transmission-shaft and the shaft 5, respectively. The rear end of the shaft 5, which carries the disk 8, is held in the roller-bearing 18, and its forward end is held in the hub 6" on the part 6' and is connected therewith by a spline or key 5'. The hub 6" also receives the rear end of the motor or engine shaft 2", whereon the clutch part or cone 6' is slidable. Suitable springs within the part 6' tend to tighten the clutch. The hub 6" is provided with a groove 6''' to receive the upper end or fork of the arm 7", and when the foot-lever 7 is thrown forward the clutch will be loosened without moving or shifting the shaft 5 longitudinally. Such movement is imparted to the shaft through a separate connection arranged between the roller-bearing 18 and the arm 7, as shown in Figs. 9 and 10. The rollers of the bearings are arranged in a barrel 19, that is slidable in the bearing-box 16', which forms a part of the variable-gear casing. The lower part of the box 16' is provided with a slot 16", and the barrel 19 has a lug 19' extending through it for connection with the operating-toggle 20. One or the other of the links of this toggle is made adjustable, and the forward end of the toggle takes the form of an acute-angled bell-crank, which is pivoted between lugs upon the box 16'. The telescoping rod 21 connects the short arm 20' of the toggle device to the arm 7". The parts of the telescoping rod are connected by a slot and pin 21', which permit the necessary lost motion between the connected members 20 and 7". A spring 21" in the telescoping rod tends to extend or elongate the rod. The arrangement and dimensions of the parts are such that when the foot-lever 7 is moved forward the friction-cone will first be disengaged and then the rod 21 will come into action to break or shorten the toggle 20, as shown in Fig. 10, and thus retract the roller-bearing barrel, the shaft 5, and the gear-disk 8. Upon the release of the foot-lever 7 the friction-cone, and hence the arm 7", will be thrust back by the clutch-spring, the operation being, first, through the medium of telescoping rod 21, to raise and straighten the toggle 20, to drive the disk 8 back into mesh with the pinion 10, and to then engage the movable cone of the friction-clutch with the one on the motor fly-wheel, the rod 21 collapsing sufficiently to permit such engagement. The middle pivot of the toggle at such times moves past the center line of the toggle and stops against the bottom of the box 16', in which position it will be held by the back pressure of the gear. The clutch-springs are thus relieved from the duty of holding the variable-gear members in mesh, and the roller-bearing 18 is made to take the thrust of the disk 8. As this thrust is considerable, I may provide an additional thrust-bearing 18' on the shaft 5 at the end of the barrel 19.

Figure 11:
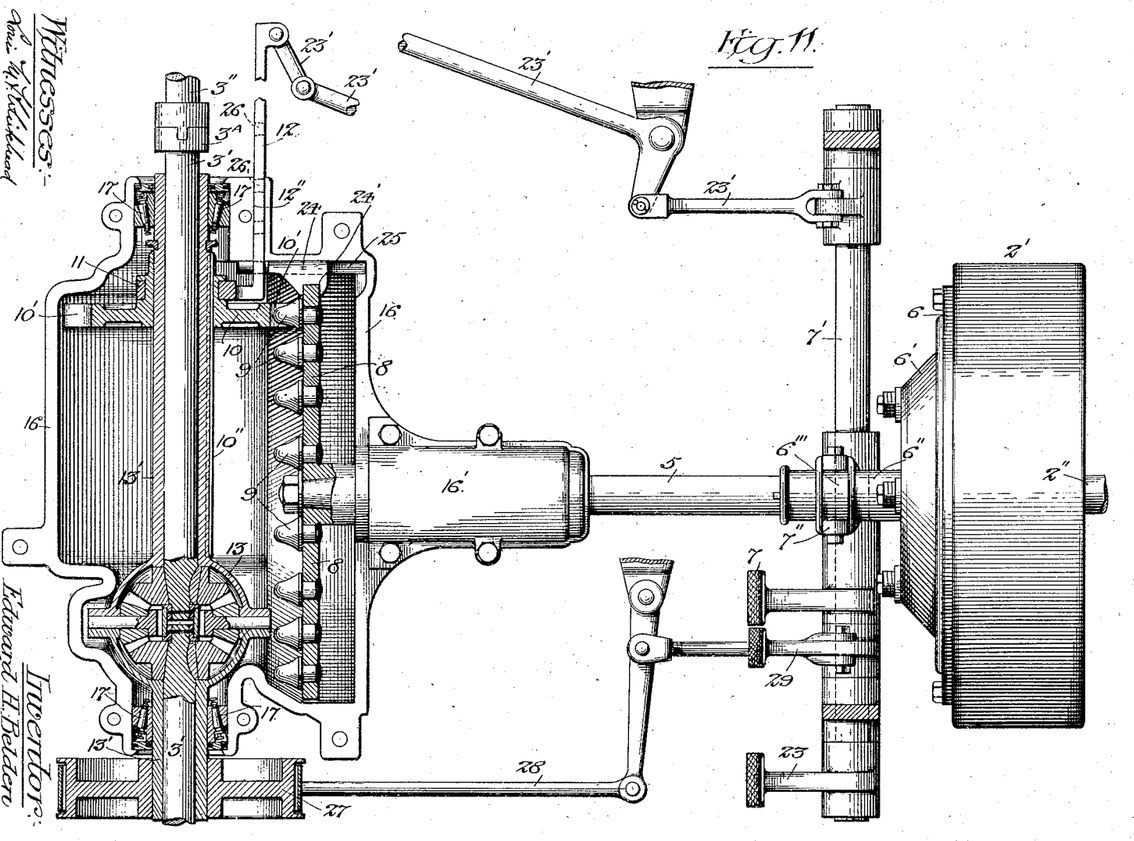
Fig. 11 is a plan view taken from Fig. 9.
Figures 12, 13, 14:
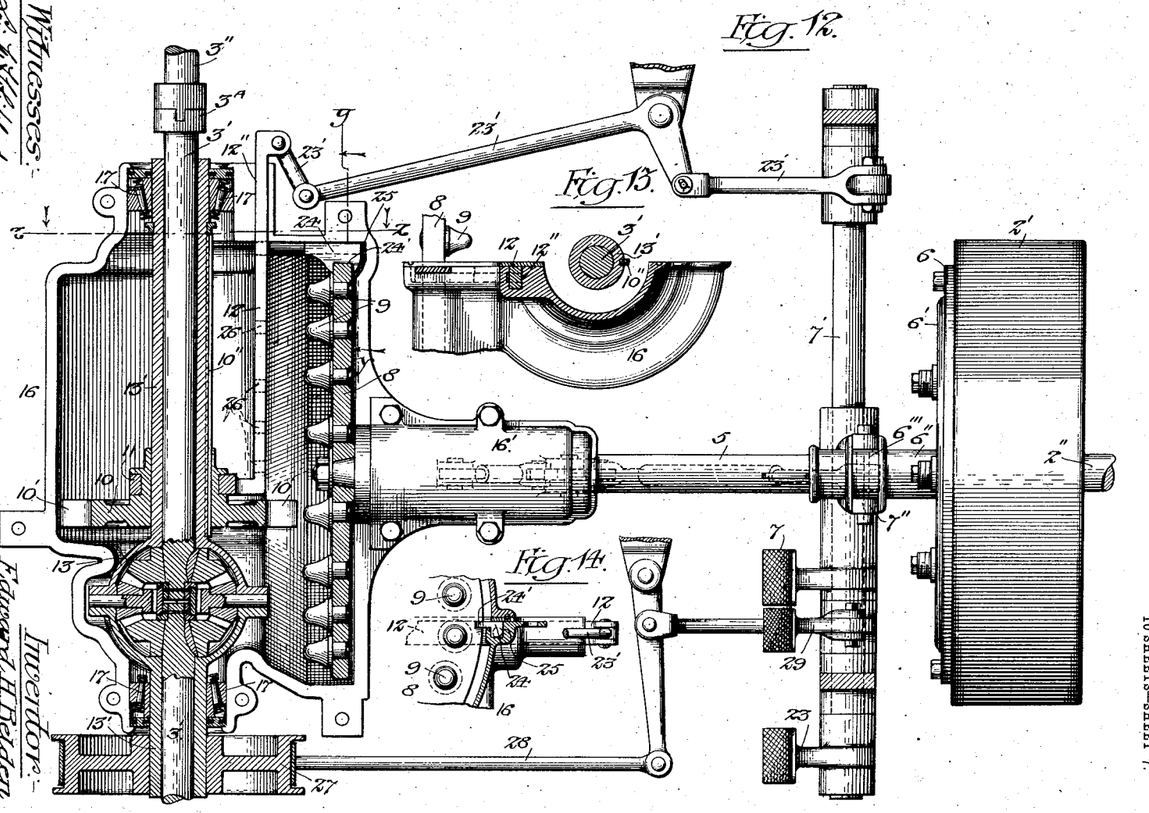
Fig. 12 is a plan view taken from Fig. 10.
Figs. 13 and 14 are detailed sectional views on the lines $z\ z$ and $y\ y$, respectively, of Fig. 12.
Figure 15:
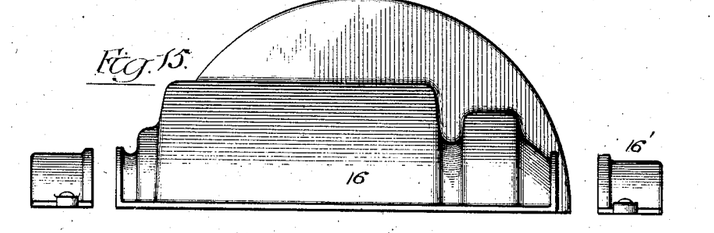
Figs. 15, 16, and 17 show the members of the variable gear in rear elevation as they appear when separated.
Figure 16:
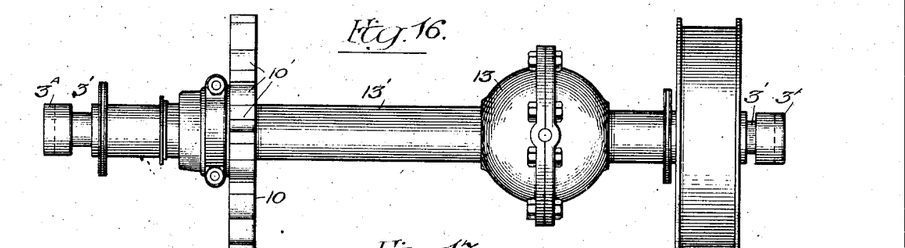
Figure 17:
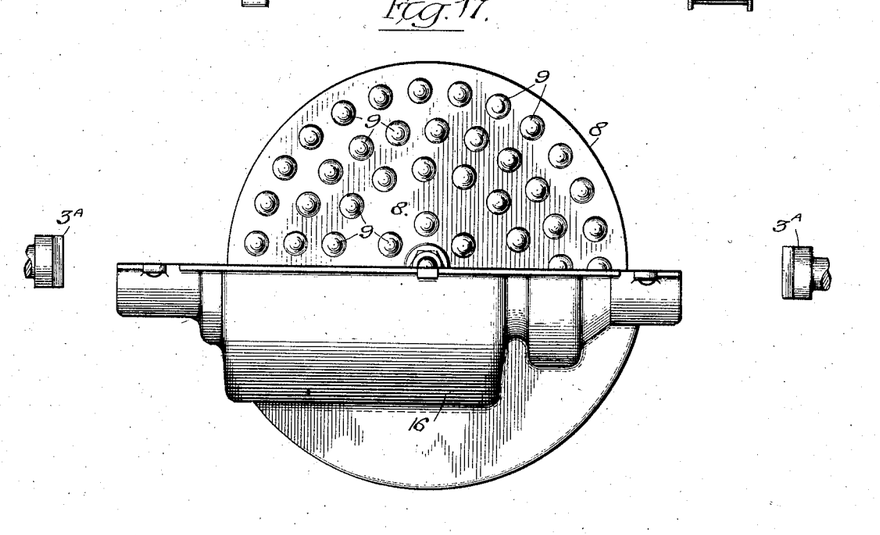

Referring now to the transmission-shaft of the mechanism, the hubs 13' of the compensating-gear case 13 are held in the roller-bearing 17 17, and each hub contains a part of what has been termed the "transmission-shaft" 3. Each part 3' 3' has a beveled gear within the gear-case 13, and these gears are connected by the usual compensating pinions. The shaft 3 is completed by the end sections 3", which are held in the bearings or hangers 3''' on the vehicle-frame. The several parts of the transmission-shaft are connected by the couplers 3$^A$ 3$^A$. (See Figs. 12 and 17.) When these couplers are disjointed, the whole compensating gear, with pinion 10, may be removed from the gear-casing. There is no connection between the shaft-parts 3' and the transmission-gear case except that which is afforded by the gears contained in said case. The power of the gear-disk is applied to the compensating-gear case through the medium of the pinion 10, which is longitudinally adjustable upon one of the hubs 13' of said case. A key 10" connects the hub 13' with the pinion 10 for rotation together while permitting the longitudinal movement and adjustment of the pinion on said hub. The pinion-shifting rod 12, connected to the pinion by collar 11, as before explained, is slidable in a suitable bearing 12" in the end of the casing 16, and the pinion is thereby movable from the inner circle of teeth upon the disk to the extreme opposite side and last row of teeth upon said disk, as shown by Figs. 11 and 12 of the drawings. Any suitable means may be made for shifting the rod 12 and the pinion 10 to which it is attached. For example, the shifter instead of being operated by hand at a point adjacent to the steering-wheel may be better arranged for operation by a foot pedal or lever 23. This lever may be rigidly attached to the rocking shaft 7', on which the lever 7 is journaled. A series of levers and arms 23' connect the rocking shaft 7' with the pinion-shifting rod 12. The operation is as indicated in Figs. 11 and 12. A suitable spring (not shown) is employed for returning the foot-lever 23 when it is released.

24 represents the shifter and pinion locking device which I employ to secure the pinion in exact position and to prevent the engagement or meshing of the variable-speed-gear members except when they are properly adjusted. This locking device comprises a bolt which is slidable in a bearing 25, provided in the gear-casing 16. (See Figs. 11, 12, and 14.) The bolt is provided with a jaw 24' to engage the edge of the gear-disk 8, and hence the bolt will move back and forth with said disk. The shifter has a number of holes 26 26, which correspond to the different positions of the shiftable pinion 10. The holes 26 are of uniform size and the bolt is adapted to enter either of the holes. On the other hand, the bolt cannot enter unless a hole in the shifter is directly opposite it, and if this is not the case the shifter will block the return of the bolt and prevent the improper meshing of the disk 8 with the pinion. This simple device thus effectively protects the gears from the effects of careless manipulation and in addition to preventing the improper meshing of the gears serves to prevent the shifting of the pinion until the disk 8 has been retracted by a foot or clutch lever 7 to withdraw the bolt 24.

It will be obvious that the variable-speed gear can be manipulated only when disconnected from the motor.

Figure 22:
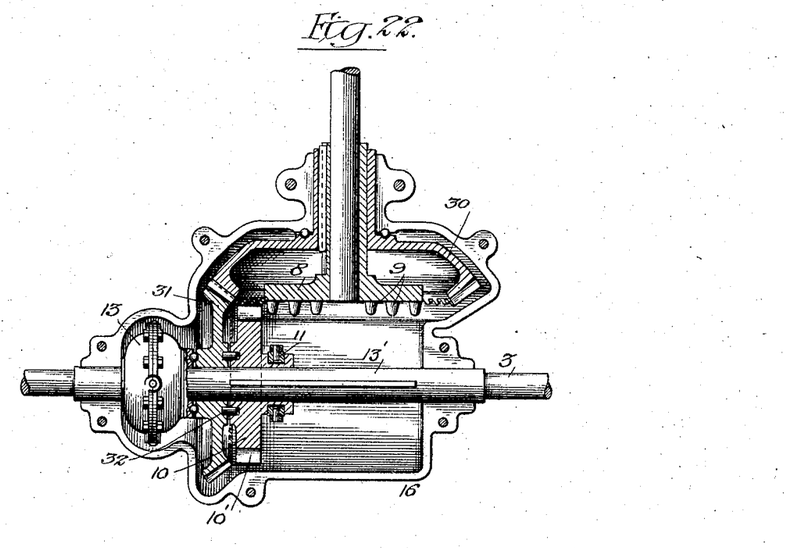
Fig. 22 is a sectional plan view illustrating a modification of my invention wherein permanently-engaged beveled gears are utilized for imparting the high speed to the driven shaft.
Figure 23:
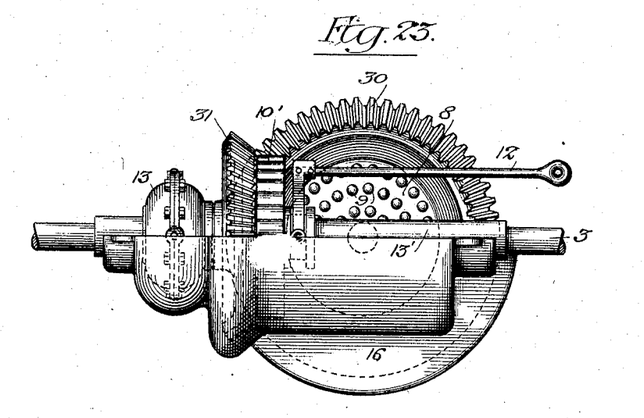
Fig. 23 is a rear end view thereof, the top of the gear being removed.

A band-brake wheel 27 is preferably arranged on one of the hubs 13' of the compensating gear, and the band-operating rod and levers 28 are arranged for operation by a foot pedal or lever 29, arranged at the side of the pedal 7. By a single foot movement the power-transmitting mechanism may be disconnected from the motor and the brake applied simultaneously. I prefer to connect the engine or motor governor with the foot-lever 7 for the purpose of cutting down the speed of the engine when the clutch is thrown out. In cases where the variable-speed gear is used for little else than to slowly increase the speed of a vehicle or other driven mechanism and where for the greater part it runs at the highest speed of transmission I sometimes prefer to supplement the spurred disk and pinion by adding continuously-engaged beveled gears 30 and 31, as shown in Figs. 22 and 23. The gear 30 is of greater diameter than the disk 8, and a clutch 32 of a suitable kind is arranged between the pinion 10 and the gear-wheel 31. The pinion in this case is arranged to be wholly disconnected from the disk 8, and at such times through the medium of the clutch 32 serves to connect the gear 31 to the transmission-shaft. The feature of disconnecting the pinion from the disk for the purpose of allowing the same to run free may be utilized in conjunction with the constructions above described.

I will now describe in detail the gear members 8 and 10, which constitute the important elements of my invention and which if made in any other than substantially the shapes herein shown will render the remaining portion of the invention of little value.

The principle of my invention is that like curves when caused to move and contact in the same plane by being rotated about axes that are relatively perpendicular will engage and remain in rolling contact until the moment of departure, passing meantime through the stage of coincidence. Herein the principle of my invention differs from that of ordinary gears which has to do with complementary reverse curves, having but a single point of rolling contact.

Figures 18, 19, 20, 21:
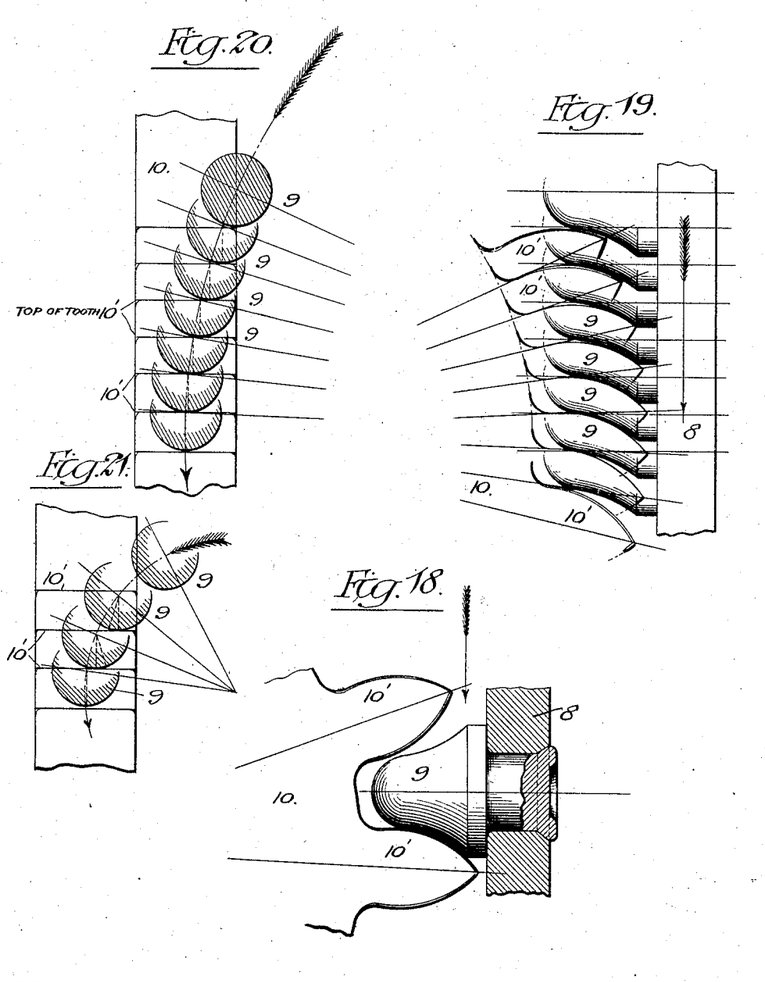
Fig. 18 is an enlarged detail showing the shape of the gear-teeth.
Fig. 19 is a diagrammatic side view illustrating the movement of a pair of engaged disk and pinion teeth.
Fig. 20 is a similar diagrammatic end view facing the pinion.
Fig. 21 is a similar end view.

The peculiar and novel forms of my gears and the operation of the engaged teeth will be understood by reference to Figs. 9 to 20 of the drawings. The pinion 10 is an ordinary single-curve spur-gear of well-known form, save that the teeth are more pointed than usual and the edges of the teeth are not sharp but are slightly beveled. (Not shown.) The teeth are pointed to prevent the lodging of the disk-teeth thereon when the gears are being placed in mesh, and the edges of the teeth are beveled to afford clearance for the disk-teeth, which enter from the side. The disk-teeth are preferably of uniform size and form throughout and are preferably circular in cross-section. An elliptical cross-section may be adopted without departing from my invention. The theoretical or technical advantages of the elliptical cross-section are negligible, however, for ordinary uses, and I have deemed it unnecessary to illustrate such forms. The teeth 9 are substantially conical and have rounded ends, the conical form being departed from also to the extent that the sides of the teeth are curved to exactly correspond with the side curves of the pinion-teeth. The disk-teeth may be defined as possessing the form of a solid which would be described by the rotation about an axis of one of the concave or space lines of the pinion slightly contracted—that is, the line extending from the point of one pinion-tooth to the point of the next. The axes of the two gears are in the same plane, and therefore as the tooth upon the disk approaches the side of the pinion 10 said tooth by reason of its rotation around the axis of the disk will enter the pinion from the side and will roll laterally across the engaged pinion-tooth, as represented in Figs. 20 and 21, and as it descends will rock or roll longitudinally upon said pinion-tooth, as represented in Fig. 19. The resultant compound rolling movement of the disk-tooth describes an angular or diagonal line of contact upon the pinion-tooth, with minimum slippage between the parts. The disk-tooth is, in effect, a rolling wedge which tends to depress the pinion-tooth as it moves across the same and at the same time, from the movement in the plane of the pinion, imparts the necessary travel thereto after the manner of an ordinary gear. Inasmuch as the disk-teeth are of the same shape in all of the series or rows upon the disk and are separated by the same spaces, it is obvious that the pinion will work as well with one row as another, and the lateral rolling action of the disk-teeth upon the pinion is augmented as the pinion is moved from one set to the other toward the center of the disk, and the gear is therefore admirably adapted for moving a heavy load at a low speed.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a variable-speed gearing two toothed members, mounted upon relatively perpendicular axes, and each longitudinally movable upon its axis, in combination with means for so moving said members, one of said members having ordinary spur-teeth upon its periphery and the other provided with a plurality of circular rows of teeth upon its side or face, the latter teeth being concavely curved and of uniform size and arrangement throughout, substantially as described.

2. A gear member for engagement with an ordinary simple pinion arranged at right angles to it and having several circular rows of uniformly-spaced teeth upon its side or face, said teeth being substantially circular in cross-section and concavely curved in longitudinal section, substantially as described.

3. A gear member having upon its side or face a plurality of circular rows of uniformly-spaced teeth, said teeth being of uniform dimensions and being concavely curved in longitudinal cross-sections, substantially as described.

4. In a gearing of the class described, a spur-pinion, in combination with a disk arranged at right angles to said pinion and provided with a plurality of circular rows of spurs or teeth for engagement with said pinion, and the teeth of said pinion and disk being inversely and obversely curved, substantially as described.

5. In a variable-speed gearing, two members arranged at right angles and comprising a simple spur-gear and a toothed disk, the teeth of the latter being fixed therein and adapted for lateral and longitudinal rolling movement upon and in relation to the teeth of the other, substantially as described.

6. A gearing of the class described, comprising two spurred members, mounted for rotation upon perpendicular axes, the periphery of one being presented to the spurred side or face of the other, said other having a plurality of circular rows of uniformly-spaced teeth, in shape the reverse of the longitudinal section of the teeth of the first member, the teeth of the first member being substantially rectangular in cross-section and the teeth of the other being substantially circular in cross-section, substantially as described.

7. In a gearing of the class described, a disk having a plurality of circular rows of teeth upon its side or face, said teeth being concavely curved in longitudinal section and substantially circular in cross-section, in combination with a pinion having its periphery provided with spur-teeth, substantially rectangular in cross-section and convexly curved in longitudinal section, suitable mountings for said disk and pinion and means for relatively shifting said disk and pinion, substantially as described.

8. In a variable-speed gearing, suitable shafts arranged at right angles, a pinion slidable on one of said shafts and having simple spur-teeth convexly curved in longitudinal section, a disk arranged upon the other shaft and having upon its side face a plurality of circular rows of substantially circular, longitudinally-concave teeth, for engagement with said pinion-teeth, means for moving said disk longitudinally to first disengage it from the pinion and mechanism for thereafter shifting said pinion, substantially as described.

9. In a variable-speed gearing, two shafts arranged at right angles, in combination with a spur-pinion on one of said shafts, means for moving said pinion longitudinally thereon, means for locking the same in either of several positions and a longitudinally-movable multiple gear for engagement with said pinion in its different positions and adapted to operate said locking means, substantially as described.

10. In a variable-speed gearing, a multiple-gear disk and a pinion arranged at right angles and both longitudinally movable, in combination with a bolt-and-bar mechanism adapted to secure said gears in different positions of engagement and prevent any but proper engagement thereof, substantially as described.

11. In a variable-speed gearing, a transmission-shaft having suitable bearings, in combination with a spur-pinion, means for moving said pinion longitudinally, a driving-shaft at right angles to the first shaft, and having suitable bearings, a multiple-gear disk arranged on said driving-shaft to engage said pinion, a toggle mechanism adapted for locking, unlocking and retracting said disk, and means for locking said pinion against longitudinal movement except when free from said disk, substantially as described 12. In a mechanism of the class described, a suitable motor-shaft and a driven shaft, in combination with a suitable clutch for joining said shafts, a multiple-gear disk on said driven shaft, a shiftable pinion for engagement with said disk, a lever and means operable by a single movement of said lever to successively disengage said clutch and retract said disk, and adapted upon reverse movement to replace said disk and then the clutch, and means for shifting said pinion, substantially as described.

13. In a mechanism of the class described, a suitably-mounted longitudinally-movable multiple-gear disk and means for shifting the same, in combination with a shiftable spur-pinion for engagement with said disk, a shifting-rod attached to said pinion and a rod-locking bolt adapted to move with said disk, substantially as described.

14. In a mechanism of the class described, a multiple-gear disk and its shaft, in combination with a shiftable pinion and its shaft, a longitudinally-movable bearing for said disk-shaft and a toggle-lever for moving and locking said bearing, substantially as described.

15. In a mechanism of the class described, a suitable motor-clutch and clutch-operating means, in combination with a driving-shaft connected to one member of said clutch, a clutch-shifting device, a multiple-gear disk mounted on said shaft, a toggle for operating said disk and shaft and when straightened adapted to lock the same in position, a lost-motion connection between said toggle-lever and the clutch-operating means and a shiftable pinion, suitably mounted for engagement with said disk, substantially as described.

16. In a mechanism of the class described a motor-driven shaft having suitable bearings, in combination with a multiple-gear disk arranged on said shaft, means for retracting said disk, a transmission-shaft, comprising a compensating-gear mechanism and end sections constituting parts thereof, other sections having stationary bearings and suitable couplers joining said sections and a pinion longitudinally movable upon a portion of said compensating-gear mechanism and removable therewith upon the disconnection of said couplings, substantially as described.

17. In a mechanism of the class described, a suitably-mounted, longitudinally-movable multiple-gear disk and means for longitudinally moving the same, in combination with a transverse shaft, a pinion longitudinally movable thereon for engagement with said disk, a locking part movable with said pinion, means for moving said pinion and locking part, and a member movable with said disk, adapted to lock said locking part in certain of the positions of the latter and to be itself locked by said part when not in said certain positions, substantially as and for the purpose specified.

18. In a mechanism of the class described, a clutch, in combination with a driven shaft whereto one member of said clutch is connected, means for shifting said member, a multiple-gear disk provided on said shaft, a bearing for said shaft, a guide wherein said bearing is slidable, a toggle connecting said guide and said bearing, and suitable means connecting said toggle with the clutch-member-operating means, substantially as described.

19. In a mechanism of the class described, a motor-clutch, in combination with a drive-shaft connected to one member thereof, a multiple-gear disk provided on said shaft, a transverse shaft, a pinion movable thereon for engagement with said disk in different positions, a pinion-locking member, a locking part for coöperation therewith and actuated with said disk, a brake for checking the rotation of said pinion, a transverse shaft, a rocking shaft, foot-levers upon said rocking shaft for simultaneously operating said clutch member, said disk and said brake, and another foot-lever on said rocking shaft for operating said pinion-locking bar, substantially as described.

20. In a mechanism of the class described, a spur-pinion and its shaft, in combination with a disk and its shaft, arranged at right angles to the pinion-shaft, a plurality of rows of holes in said disk, a plurality of disk-teeth having shanks riveted in said holes, said disk-teeth being substantially circular in cross-section and being concave in longitudinal section and having broad bases, substantially as described.

21. In a variable-speed gearing, two shafts arranged at right angles in combination with a pair of bevel-gears for connecting said shafts, a pair of spur-gears also for connecting said shafts, means for connecting the spur-gear of one shaft with the bevel-gear thereon, one of said spur-gears being provided with a plurality of circular rows of uniformly-spaced teeth and the teeth of said spur-gears being inversely and obversely curved, respectively, substantially as described.

22. In a variable-speed gearing, two shafts arranged at right angles in combination with two gear members arranged upon said shafts respectively and comprising a simple spur-gear and a toothed disk, the teeth of the latter being substantially circular in cross-section and concavely curved in longitudinal section to roll laterally and longitudinally upon and in relation to the teeth of said spur-gear, means for disengaging said gear and disk, normally engaged bevel-gears upon said shafts, and means for connecting said spur-gear with the bevel-gear upon its shaft, substantially as described.

23. In a variable-speed gearing, a driving-shaft and a driven shaft in combination with a bevel-gear upon said driving-shaft, a second bevel-gear journaled upon or about said driven shaft, spur-gears mounted upon said shafts, one of said spur-gears being longitudinally movable upon its shaft for engagement with and disengagement from the bevel-gear thereon, and one of said spur-gears being a pinion and the other a disk provided with a plurality of circular rows of uniformly-spaced teeth which are substantially circular in cross-section and concavely curved in longitudinal section, substantially as described.

24. In a variable-speed gearing, a suitable frame in combination with longitudinal and transverse shafts therein, a bevel-gear upon said longitudinal shaft, a second bevel-gear journaled on said transverse shaft and driven by the first gear, a spur-pinion slidably keyed to said transverse shaft, means for moving said pinion, means for connecting said spur-pinion with the bevel-gear upon said transverse shaft, and a speed-varying disk-gear having a plurality of circular rows of uniformly-spaced teeth upon its side or face for coöperation with said pinion, said disk-teeth being substantially circular in cross-section and concavely curved in longitudinal section, and said pinion-teeth being convexly curved, substantially as described.

25. In a variable-speed gearing, a suitable frame in combination with a longitudinal and a transverse shaft therein, constantly-engaged bevel-gears upon said shafts, a spur-pinion upon one of said shafts, a disk-gear for coöperation with said pinion, said disk being provided with a plurality of circular rows of teeth which are substantially circular in cross-section and concavely curved in longitudinal section, means for engaging and disengaging said disk and pinion and for engaging said pinion with one of said bevel-gears when the pinion is disengaged from said disk, substantially as described.

26. In a variable-speed gearing, a suitable frame in combination with a driving-shaft and a driven shaft, a bevel-gear for rotation with said driving-shaft, a second bevel-gear engaged therewith and journaled upon said driven shaft, a gear-disk for rotation with said driving-shaft, a simple spur-pinion for rotation with said driven shaft, means for connecting the bevel-gear and the pinion upon said driven shaft, means for moving said disk and pinion longitudinally upon their axes, the teeth of said pinion and disk being inversely and obversely curved, substantially as described.

27. In a variable-speed gearing, a driving-shaft in combination with a transverse shaft 13', a bevel-gear fixed upon said driving-shaft, a second bevel-gear journaled upon said shaft 13', a simple spur-gear slidably mounted upon said shaft 13', means for sliding said spur-gear and for connecting the same with the bevel-gear on said shaft 13', and a longitudinally-movable speed-varying gear-disk for engagement with said spur-gear when said spur-gear is disengaged from said bevel-gear, said disk being provided with a plurality of circular rows of teeth which are substantially circular in cross-section and concavely curved in longitudinal section, as and for the purpose described.

In testimony whereof I have hereunto set my hand, this 1st day of July, 1904, at Chicago, Illinois.

EDWARD H. BELDEN.

In presence of—
  C. G. HAWLEY,
  JOHN R. LEFEVRE.